United States Patent [19]

Ramsay et al.

[11] Patent Number: 4,757,374

[45] Date of Patent: Jul. 12, 1988

[54] VIDEO DISC RECORDING MACHINE

[75] Inventors: Eugene B. Ramsay, Stillwater; Thomas E. Ramsay, St. Paul, both of Minn.

[73] Assignee: Image Premastering Services, Ltd., Mendota Heights, Minn.

[21] Appl. No.: 841,568

[22] Filed: Mar. 20, 1986

[51] Int. Cl.[4] ............................................. G03B 27/52
[52] U.S. Cl. ............................................. 355/40; 355/55
[58] Field of Search .................... 355/40, 55; 352/87

[56] References Cited

U.S. PATENT DOCUMENTS

| | | | |
|---|---|---|---|
| 2,174,931 | 10/1939 | Terry et al. | 355/40 |
| 2,229,761 | 1/1941 | Mueller | 355/55 |
| 2,249,033 | 7/1941 | O'Grady | 355/55 |
| 3,183,770 | 5/1965 | Nyman et al. | 352/87 |
| 3,415,600 | 12/1968 | Yarbrough | 352/87 |
| 3,682,540 | 8/1972 | Oxberry et al. | 355/40 |
| 3,698,806 | 10/1972 | Reitz | 355/40 |
| 3,867,022 | 2/1975 | Whatley et al. | 352/87 |
| 4,035,067 | 7/1977 | Whatley et al. | 352/87 |
| 4,150,883 | 4/1979 | Whatley et al. | 352/87 |
| 4,214,823 | 7/1980 | Pritchard | 352/87 |

Primary Examiner—Monroe H. Hayes
Attorney, Agent, or Firm—Moore & Hansen

[57] ABSTRACT

A method and apparatus for reproducing and recording images from an original slide, film strip, microfiche, or the like to the same or another medium, including a portable modular system which may be readily moved from one location to another. The portable modular system includes an image support module which supports the image to be recorded along the optical axis of the system. An image recorder module is provided with a recording surface upon which the original is to be recorded. A condensing lens module is positioned between the image support module and the recorder module, and a projection lens module is positioned along the optical axis between the condenser lens module and the image support module. A zoom optics lens is positioned along the optical axis adjacent the recorder module. The optical system is operable to permit still images to be recorded at a high rate of speed, while simultaneously monitoring with a computer control the horizontal and vertical orientation of the slides and simultaneously recording inventory information.

14 Claims, 10 Drawing Sheets

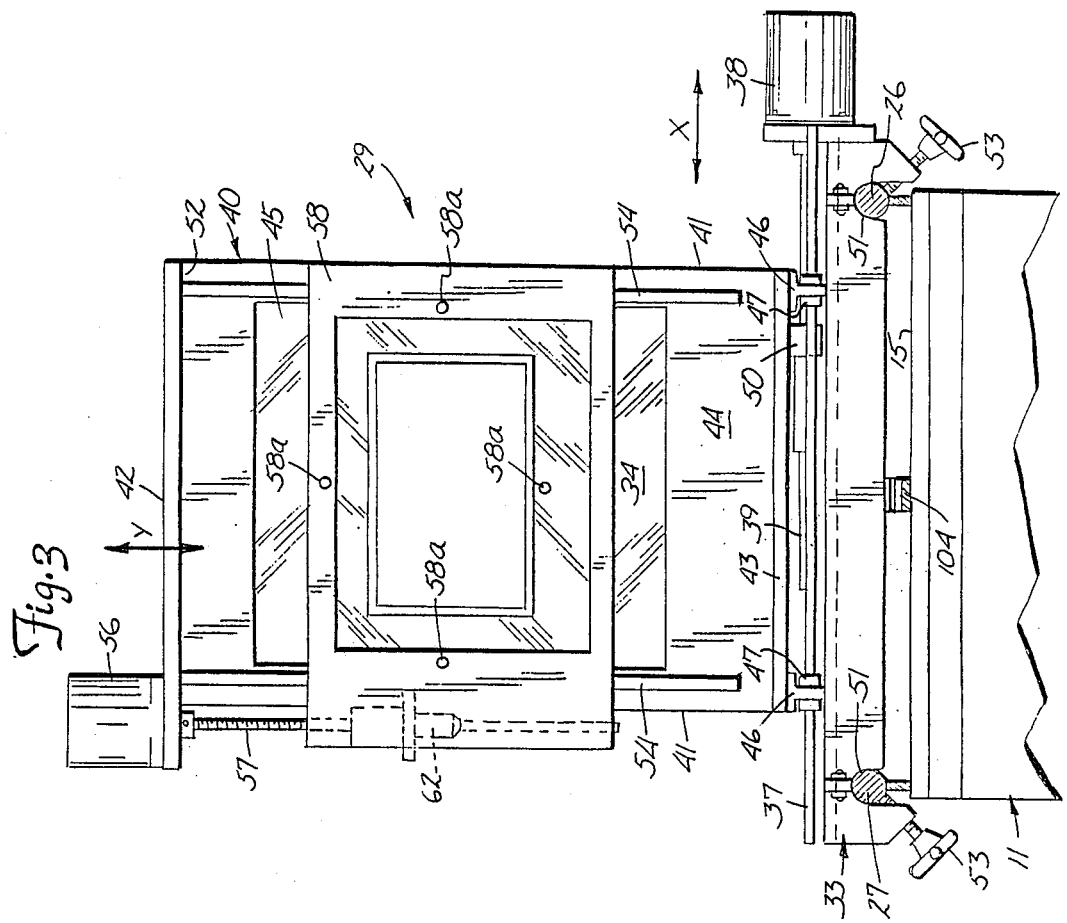
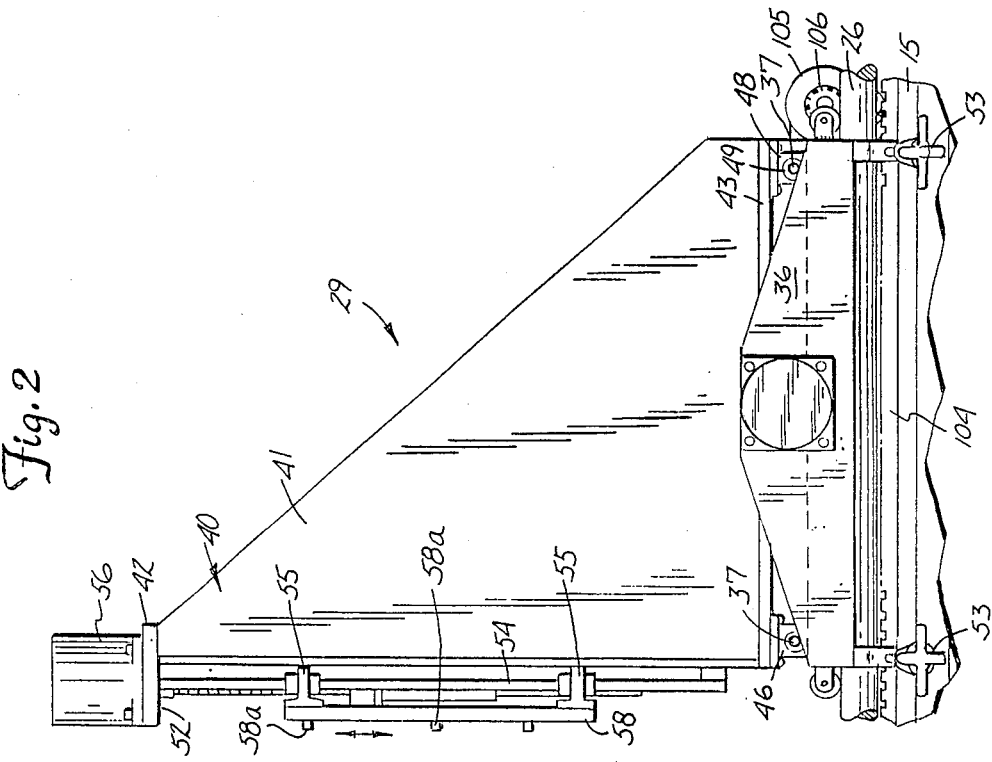

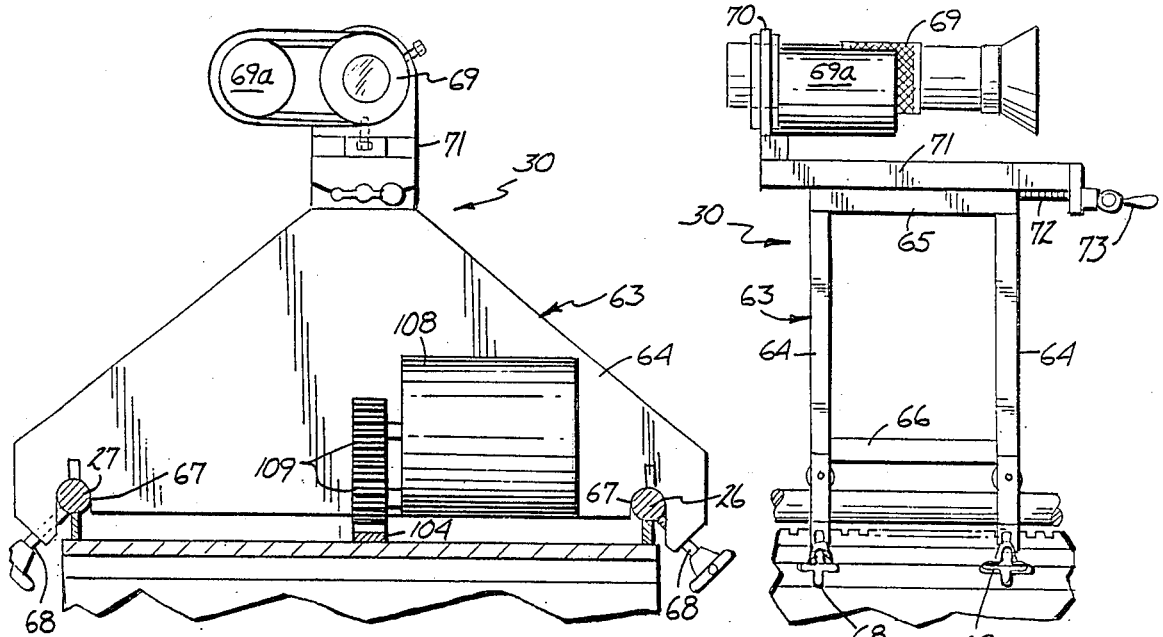
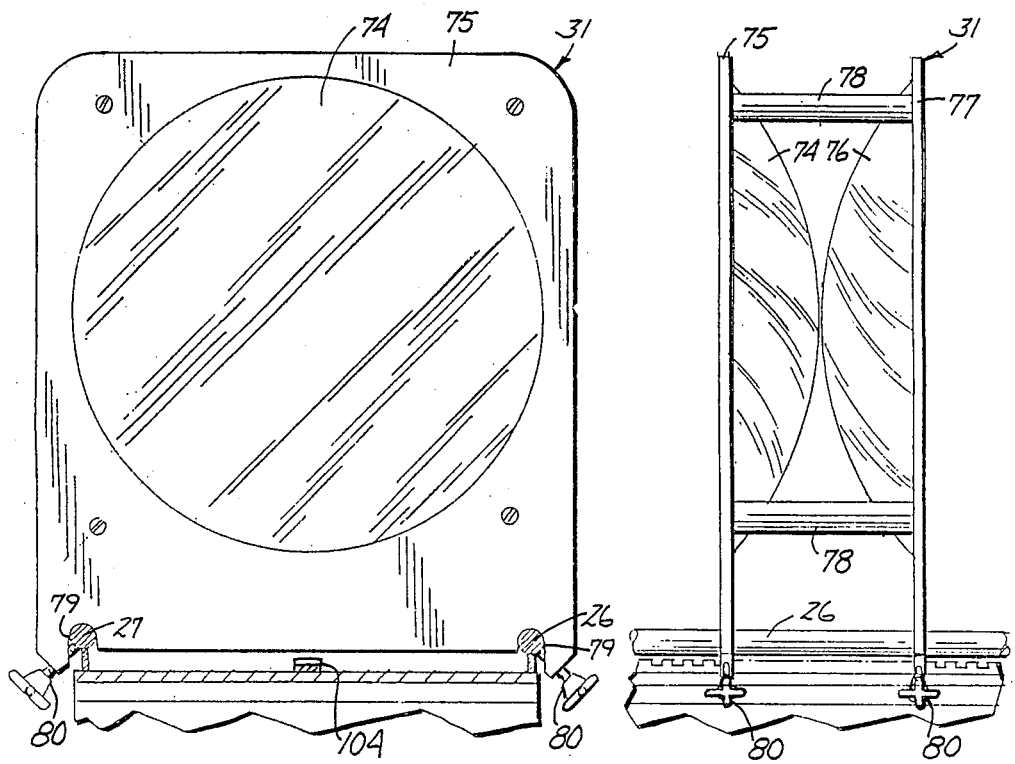
Fig. 6    Fig. 7
Fig. 8    Fig. 9

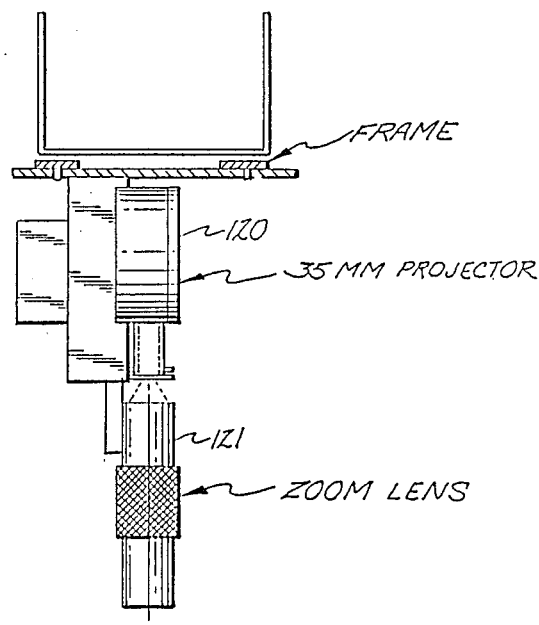
Fig. 13
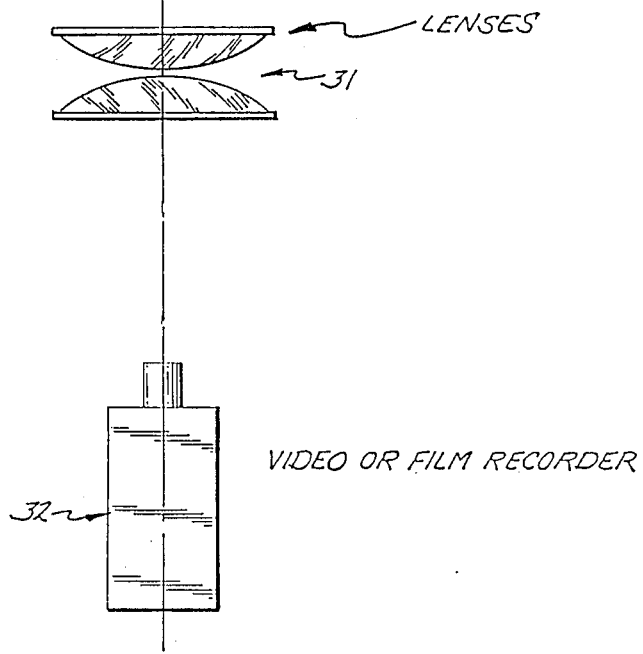

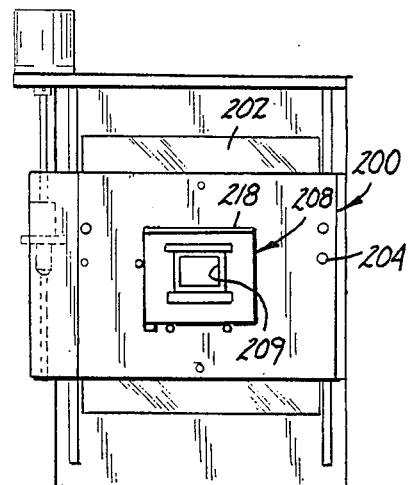
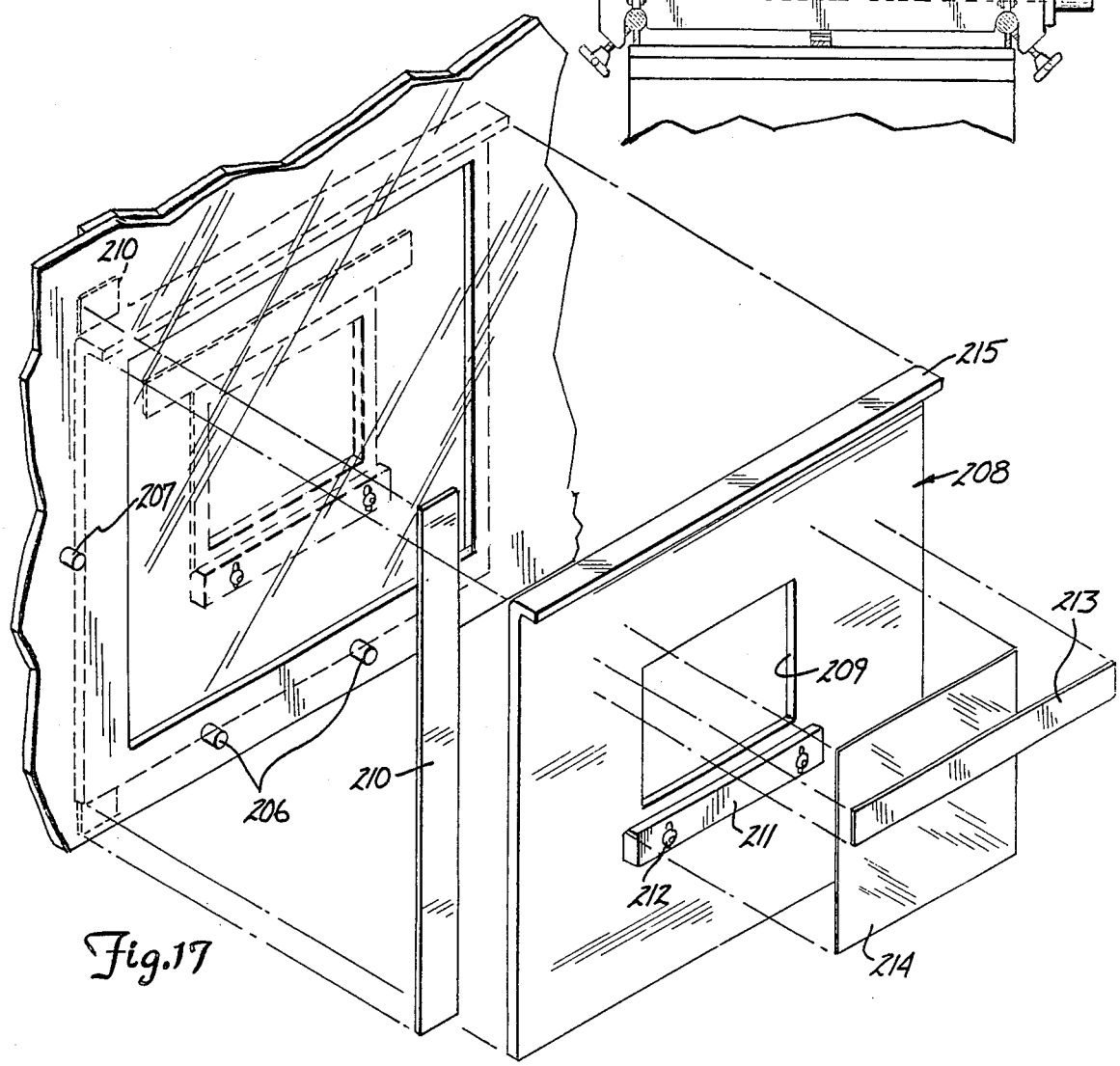

VIDEO DISC RECORDING MACHINE

This invention relates to a method and apparatus for reproducing and recording images from an original, such as a photographic slide transparency, film strip, microfiche, or the like, into the same or another medium, such as a motion picture film, video tape, or the like.

BACKGROUND OF THE INVENTION

Certain prior art apparatuses have been developed which reproduce and record photographic slide transparencies to motion picture film. Typical prior art type systems are embodied in U.S. Pat. Nos. 3,687,022 and 4,035,067.

In these systems, especially U.S. Pat. No. 4,035,067, the image from the slide transparency is transmitted by a projection objective lens system through a pair of large diameter plano-convex condensing lenses through the zoom lens of a motion picture camera, upon the film surface. Magnification may be changed in this system by focus adjustment of the camera zoom lens and by shifting the slide transparencies on the optical axis. However, in this particular arrangement, the slide image selection, the proportion, the transition, and the recording is done by a director and constitutes a time-consuming operation.

Further, there is no provision in these prior art systems for reproducing and recording images from other selected media, such as motion pictures, microfiche, microfilm, and the like.

SUMMARY OF THE INVENTION

It is a general object of this invention to provide a novel and improved system and apparatus for reproducing images from a photographic original upon the same or different medium. In using the present apparatus and practicing the present method, all of the information relating to positioning, proportioning, cropping, light intensity, transition time, and the like, are all entered into a control computer which produces control signals for controlling operation of all of the various components of the system.

With respect to slide transparencies, aerial photographs, microfiches, and the like, the images to be reproduced and recorded are selected, marking of the desired location and proportion are then made on a tissue transparency, which is used in conjunction with a grid number to determine the various numerical values for achieving the final image. With this arrangement, all of the information needed to reproduce sharp, properly oriented images from the original is preprogrammed into the control computer.

Specifically, it is an object of this invention to provide a novel optical system and method for reproducing images from an original, in which the repositioning of the original is controlled by stepper motors in response to control signals from the computer along the X and Y axes. The zoom optics and the recording medium are movable in response to control signals along an axis coextensive with the optical axis in response to control signals, and the recording medium is angularly swingable about the optical axis so that precise correct positioning can be achieved.

It is also an object of this invention to provide a modular optical system, which is portable, to permit the optical system to be readily transported from one location to another.

Another object of this invention is to provide a modular optical system for reproducing and recording images from an original, in which the various components are of modular construction, thereby permitting ready removal and replacement of any component. This arrangement allows wide flexibility, but involves a minimum of effort.

These and other objects of the invention will be more specifically defined in the following Specification.

DESCRIPTION OF THE DRAWING

FIG. 2 is a side elevational view of the image support module;

FIG. 3 is a cross-sectional view taken approximately along line 3—3 of FIG. 1 and looking in the direction of the arrows;

FIG. 6 is a cross-sectional view taken approximately along line 6—6 of FIG. 1 and looking in the direction of the arrows;

FIG. 7 is a side elevational view of the projection lens module illustrated in FIG. 6;

FIG. 8 is a cross-sectional view taken approximately along line 8—8 of FIG. 1 and looking in the direction of the arrows;

FIG. 9 is a side elevational view of the condenser lids module illustrated in FIG. 8;

FIG. 13 is a diagrammatic view similar to FIGS. 11 and 12, but illustrating the original, comprising a 35 mm film strip in a conventional projector;

FIG. 16 is an elevational view similar to FIG. 3 and illustrating an adaptor for the image support module;

FIG. 17 is a fragmentary exploded view of the adaptor illustrating the details thereof;

DESCRIPTION OF THE PREFERRED EMBODIMENT

Figure 1:
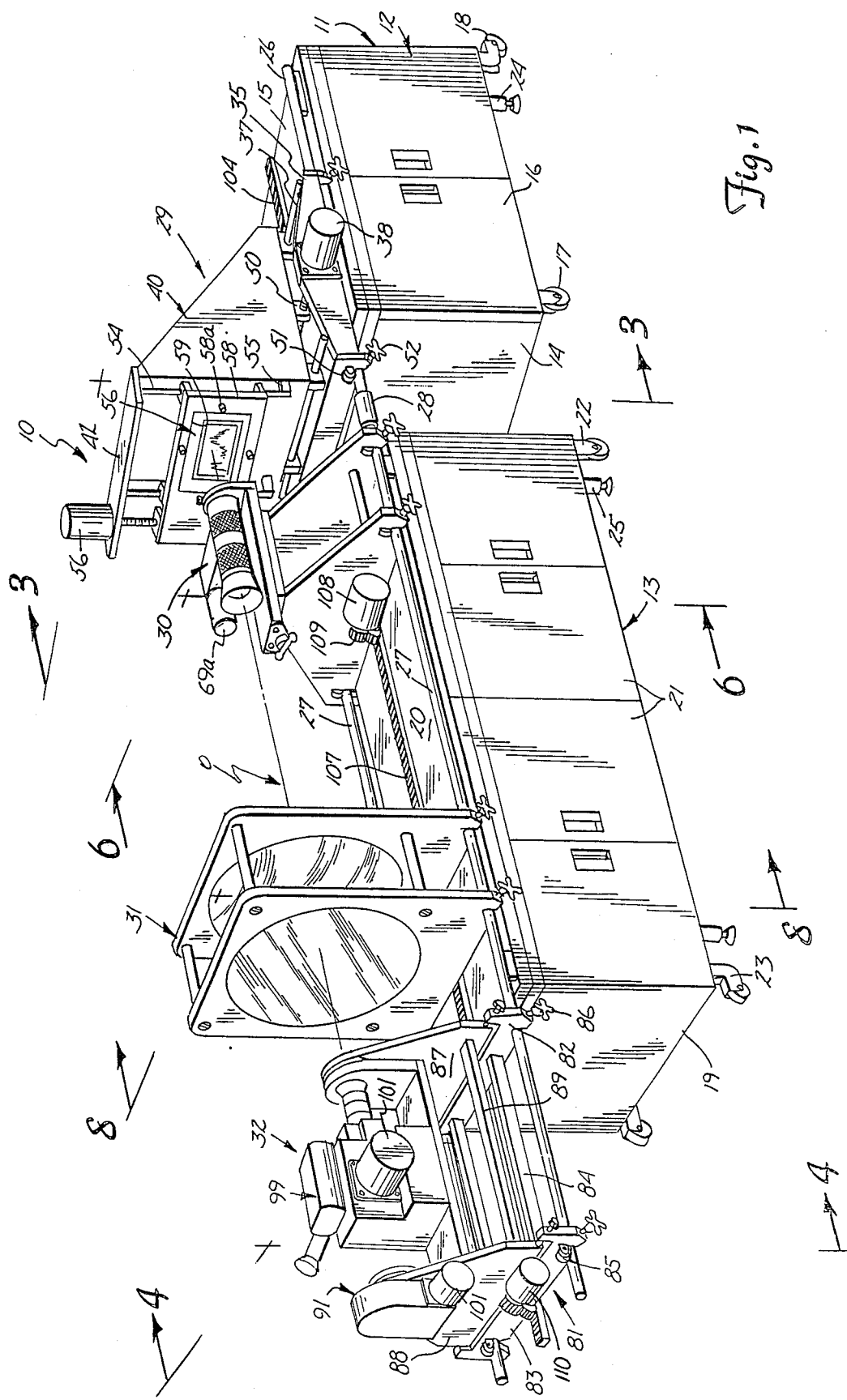
FIG. 1 is a perspective view of the novel apparatus.

Referring now to the drawings and, more specifically, to FIG. 1, it will be seen that one embodiment of the novel modular optical system, designated generally by the reference numeral 10, is thereshown. The modular optical system includes a modular base 11, which is comprised of a base unit cabinet 12 and a base unit cabinet 13. It will be appreciated that additional cabinets may also be used when desired. The base unit cabinet 12 is provided with vertical end walls, a vertical side and bottom wall (not shown), and a top wall 15. The cabinet 12 is also provided with doors 16 for providing access to the interior thereof. The cabinet 12 is supported on a pair of rollers 17 and a pair of caster rollers 18 to facilitate movement of the cabinet from one location to another.

The base unit cabinet 13 also is comprised of vertical end walls 19, top wall 20, and a side wall and bottom wall (not shown). The cabinet 13 is also provided with suitable doors 21, and is mounted on rollers 22, and caster rollers 23. The cabinet 12 is provided with a pair of vertically adjustable legs 24, while the cabinet 13 is provided with pairs of vertically adjustable legs 25. These vertically adjustable legs permit the cabinets to be maintained in a stationary position.

The cabinet 12 is provided with a pair of elongate guide rods or tracks 26 affixed thereto by brackets 26a which are disposed in substantially parallel relation with respect to the top wall thereof. The cabinet 13 is also provided with a pair of elongate substantially parallel rods or tracks 27, which are secured thereto and spaced slightly above the top wall thereof. The rods 26 are detachably coupled to the rods 27 by a suitable sleeve coupling 28 to interconnect the base unit cabinet 12 to the base unit cabinet 13.

The modular optical system includes an image support module 29, a projection lens module 30, a condenser lens module 31, and an image recorder module 32. It will be noted that the projection lens module is positioned between the image support module and the condenser lens module. It will further be noted that the condenser lens module is positioned between the image recorder module and image projection module. Each of these modules are positioned along an optical axis 0.

Referring again to FIG. 1, it will be seen that the image support module 29 is mounted on the base unit cabinet 12, while the projection lens module, plano-convex condenser lens module 31, and image recorder module 32 are all mounted on the base unit cabinet 13. Referring now to FIGS. 1, 2, and 3, it will be seen that the image support module 29 includes a base frame 33, which is of generally rectangular configuration and includes a front frame element 34, and a rear frame element 35, which are rigidly interconnected by a pair of substantially parallel side frame elements 36. A pair of elongate transversely extending substantially parallel guide rods 37 extend between and are rigidly connected to the side frame elements of the base frame 33. A stepper motor 38 is mounted on one of the side frame elements 36, and the output shaft thereof is affixed to an elongate threaded shaft 39. It will, therefore, be seen that, when the stepper motor 38 is energized, the threaded shaft 39 will be rotated.

An upper support structure carriage 40 is mounted on the base frame 33 and includes a pair of substantially identical, generally triangular shaped side plates 41, which are disposed in spaced apart substantially parallel relation. The side plates 41 are rigidly interconnected at their upper end by a substantially horizontally disposed top plate 42 and are rigidly interconnected at their lower end portions by a horizontally disposed base plate 43. A front plate 44 is rigidly secured to the side plates 41, top plate 42, and base plate 43, and front plate 44 has a central opening therein, which accommodates an image plate 45 which may formed of a light dispersing milkglass.

The base plate 43 of the upper support structure 40 is provided with a pair of laterally spaced apart front brackets 46, each having a cylindrical slide bearing 47 mounted in an opening therein. The base plate is also provided with a pair of apertured rear brackets 48, each accommodating one of a pair of cylindrical slide bearings 49 therein. The front pair of slide bearings 47 slidably engage the front guide rod 37, while the rear pair of slide bearings 49 slidably engage the rear guide rod 37. With this arrangement, the upper support structure 40 is shiftable laterally, relative to the base frame 33, in either direction.

The base plate 43 of the upper support structure also has an internally threaded nut 50 rigidly secured thereto, and this nut threadedly engages the threaded shaft 39. It is pointed out that the stepper motor 38 is a reversible drive motor and, when energized, may selectively move the upper support structure in opposite directions along the guide rods 37. It will further be noted that the front and rear frame elements of the base frame 33 are provided with recesses 51 therein for accommodating the rods 26 and 27 therein, as best seen in FIG. 3. Suitable roller bearings are provided on the base frame to facilitate movement of the image support module 29 along the rods 26 and 27. It will also be noted that the front and rear frame elements of the base frame each have a pair of clamping bolts 32 threadedly engaging a threaded recess therein, and each clamping bolt is provided with a handle 53 to facilitate tightening and loosening of the bolts. These clamping bolts may be tightened when the desired positioning of the image support module 29 has been achieved to retain the image support module in a selected adjusted position.

A pair of laterally spaced apart parallel vertical guide rods 54 are rigidly affixed to the top plate 52 of the upper support structure 40 and depend therefrom. A generally rectangular shaped vertically disposed image support frame 58 is provided with two pairs of brackets 55, each pair being arranged in upper and lower relationship and located adjacent each side of the frame. These brackets 55 are apertured and slidably engage the vertical guide rods 54 to permit vertical shifting of the image support frame 58 relative to the upper support structure 40.

A stepper motor 56 is mounted on the top plate 42 of the upper support structure and the output shaft of the stepper motor comprises an elongate vertically disposed threaded shaft 57, which depends therefrom. The threaded shaft 57 threadedly engages an internally threaded nut 62 which is affixed to the rear surface of the image support frame or carriage 58. The stepper motor 56 is reversible, and selective operation thereof causes the image support frame to be shifted either in an upward or downward direction.

The image support frame 58 is provided with a plurality of forwardly projecting pin elements 58a which permit ready mounting and ready removal of the image transport system thereon. The image transport system may be a film advance device, a slide transparency device, a 35 mm projector or any image transport system which may be mounted on the image support frame 58.

The stepper motor 38 moves the image support module, and the image to be recorded, in particular, along an axis which is defined as the Y axis. The stepper motor 56 moves the image to be recorded along an axis defined as the X axis. The X and Y axes are orthogonal with respect to the optic axis and each lies in a plane at all times substantially normal to the optic axis.

Referring now to FIGS. 1, 6, and 7, it will be seen that the projection lens module 30 includes a support frame 63 which is comprised of a pair of generally triangular shaped plates 64 arranged in fore and aft spaced apart relationship. The plates 64 are rigidly interconnected at their respective upper ends by a substantially horizontally disposed top plate 65. Suitable elongate tie rods 66 extend between and rigidly interconnect the plates 64 adjacent their lower ends. The plates 64 each have a pair of recesses 67 in the lower edge portion thereof which accommodate the rods 27 therein. Each plate 64 also has a pair of threaded recesses which are threadedly engaged by clamping bolts 68 substantially identical in construction to the clamping bolts 52. The clamping bolts, when tightened, retain the projection lens module in a preselected position with respect to the rods 27. A projection lens 69 is connected by a bracket 70 to a base plate 71, which is shiftably mounted on the top plate 65 of the support frame 63. The projection lens is positioned on the optical axis and is shiftable in an axial direction by a threaded shaft 72 which engages a nut (not shown) secured to the top plate 65. An actuating handle 73 is connected to the end of the shaft 71 for rotating the same to cause axial shifting movement of the projection lens relative to the top plate 65. It is pointed out again that the entire projection lens module may be adjusted relative to the rods or tracks 27 and that fine tuning of the position of the projection lens may be accomplished by adjusting the position of the lens axially relative to the support frame 73.

Referring now to FIGS. 1, 8, and 9, it will be seen that the condenser lens module 31 is comprised of a pair of plano-convex lenses which are arranged in predetermined spaced apart relation with respect to each other. The condenser lens module includes a plano-convex lens 74 which is mounted in a plate 75. The condensing lens module also includes the plano-convex lens 76 which is mounted in a mounting plate 77. The mounting plates 75 and 77 are rigidly interconnected together by suitable tie rods 78.

It will be noted that the lower edge portions of the mounting plates 75 and 77 each have a pair of recesses 79 therein adjacent the corners thereof for accommodating the rods or tracks 27 therein. Each plate also has a pair of threaded recesses which threadedly receive the clamping bolts 80 therein. The clamping bolts permit the condenser lens assembly to be clamped in fixed relation at a selected position on the rods 27. The condenser lenses produce an aerial image when an image is projected through the condenser lenses.

Figure 4:
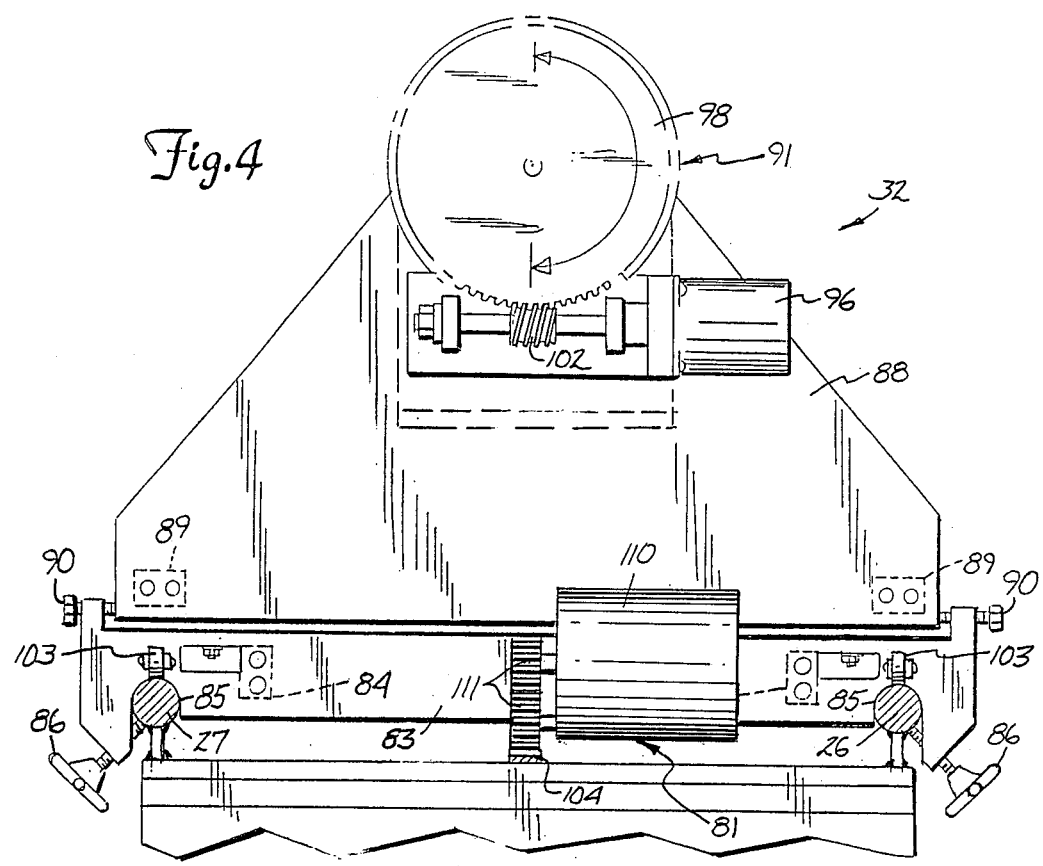
FIG. 4 is a cross-sectional view taken approximately along line 4—4 of FIG. 1 and looking in the direction of the arrows.
Figure 5:
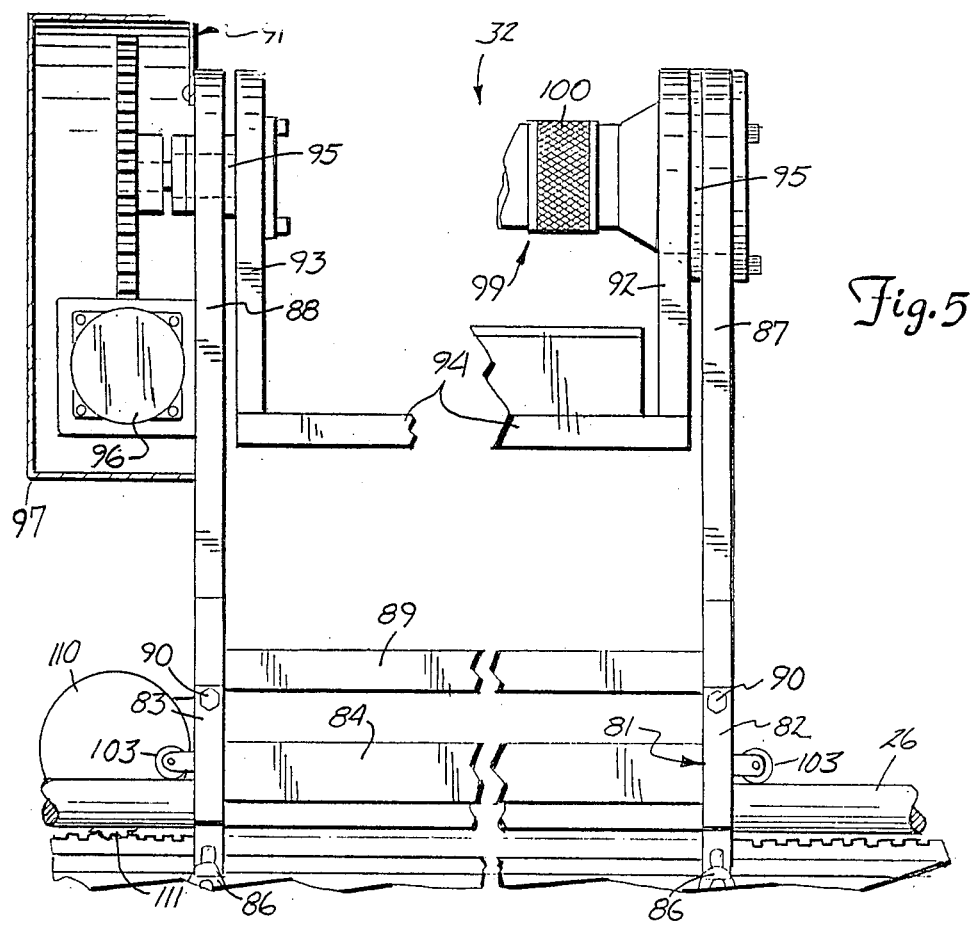
FIG. 5 is a side elevational view of the image recorder module illustrated in FIG. 4 and foreshortened for clarity.

Referring now to FIGS. 1, 4, and 5, it will be seen that the image recorder module 32 comprises a base frame 81 including a front transversely extending frame element 82 and a rear transversely extending frame element 83. The front and rear frame elements are rigidly interconnected by a pair of laterally spaced apart longitudinally extending side frame elements 84. It will be seen that the front and rear frame elements each have a pair of recesses 85 in the lower edge portions thereof adjacent the corners thereof for accommodating the rods or tracks 27 therein. Each of the front and rear frame elements also have a pair of threaded recesses therein, each of which communicates with the associated recess 85 and threadedly accommodate one of a plurality of clamping bolts 86. The clamping bolts 86 permit the base frame and image recorder module to be clamped in a fixed position on the rods 84.

The front frame element has a front generally triangular shaped plate 87 secured thereto and projecting upwardly therefrom. Similarly, the rear frame element 83 has a generally triangular shaped rear plate 88 secured thereto and projecting upwardly therefrom. The front and rear plates are rigidly interconnected together by laterally spaced apart substantially parallel longitudinally extending bars 89. In the embodiment shown, the front and rear plates are secured to the associated front and rear frame elements by bolts 90, which are engaged in threaded recesses in the associated plate. It will be noted that the bolts 90 are horizontally disposed and threadedly engage the threaded recesses in the associated front or rear frame element. With this arrangement, adjustment of the bolts 90 permits fine lateral positioning of the front and rear plates relative to the associated front and rear frame members.

An image recorder carriage 91 is shiftably mounted on the base frame for swinging movement relative thereto about a pivotal axis which is coaxially disposed with respect to the optic axis. The recorder carriage 91 includes a front plate 92 and a rear plate 93, which are rigidly interconnected by a support plate 94. The front and rear plates of the recorder carriage are respectively pivoted with the front plate 87 and the rear plate 88 of the base frame 81 by pivot bearings 95, which are coaxially disposed with respect to the optical axis 0. A stepper motor 96 is mounted on the rear plate 88 of the base frame and its drive shaft is provided with a worm gear 102 which drivably engages a gear 98 affixed to the pivot shaft or bearing 95. A suitable drive housing 97 encloses the gear and pinion. It will be seen that, when the stepper motor 96 is energized, the recorder carriage 91 may be rotated about its pivotal axis.

In the embodiment shown in FIGS. 1 and 5, the image recorder comprises a video camera 99, which is detachably mounted on the support plate 94 by suitable bolts (not shown) to permit ready removal of the recording camera from the support plate. The recording camera is provided with zoom optics 100 which are disposed on the optical axis 0 and which are mounted on the front plate 87. A suitable stepper motor 101 is also mounted on the front plate 87 of the base frame and the output shaft of the stepper motor has a worm gear splined thereto for rotation therewith. The worm gear meshes with a ring gear, which is affixed to zoom optics 100. This gear drive (not shown) is the same as the drive 102, 98 illustrated for drive motor 96 in FIG. 4. It will therefore, be seen that the magnification of zoom optics 100 may be readily adjusted by energizing the stepper motor 101.

Referring now to FIGS. 1 and 3, it will be seen that means are provided for selectively shifting the image support module 29 on the tracks 26, and for selectively shifting the projection lens module 30 and the image recorder module 32 along the rods 27. In this regard, the base frame 33 of the image support module 29 is provided with a stepper motor 105, which is provided with a gear drive 106 which drivably engages a drive rack 104 on the top wall 15 of the base unit cabinet 12. It will be seen that, when the stepper motor 105 is energized, the image support module may be moved in an axial direction along the rods 26. It is pointed out that the clamping bolts will be in the loosened condition during shifting movement of the module. Suitable rollers 52a engage the rods 26 to facilitate movement of the module relative to the rods. It will further be noted that the rods 26 are spaced slightly above the upper surface of the top wall 15 by means of suitable spacer elements 26a. Suitable spacer elements also space the rods 27 above the base unit cabinet 13.

The projection lens module 30 is also provided with a stepper motor 108 having a gear drive 109 that engages a rack 107 mounted on the top wall 20 of the base unit cabinet 13. It will be seen that the stepper motor 108 is mounted on the support frame 63 and that, when the stepper motor is energized, the projection lens module 30 will be moved relative to the rods 27. It is again pointed out that suitable roller bearings are provided for facilitating movement of the projection lens module along the rods 27.

Means are also provided for shifting the image recorder module 32 in an axial direction along the optical axis 0. This means includes a stepper motor 110 which is provided with a gear drive 111 that drivably engages the track 107. It will be seen that, when the motor 110 is energized, the image recorder module will be shifted axially along the rods 27. Movement of the image recorder, including the recording surface, is along a Z axis, which is coaxial with the optic axis.

Figure 10:
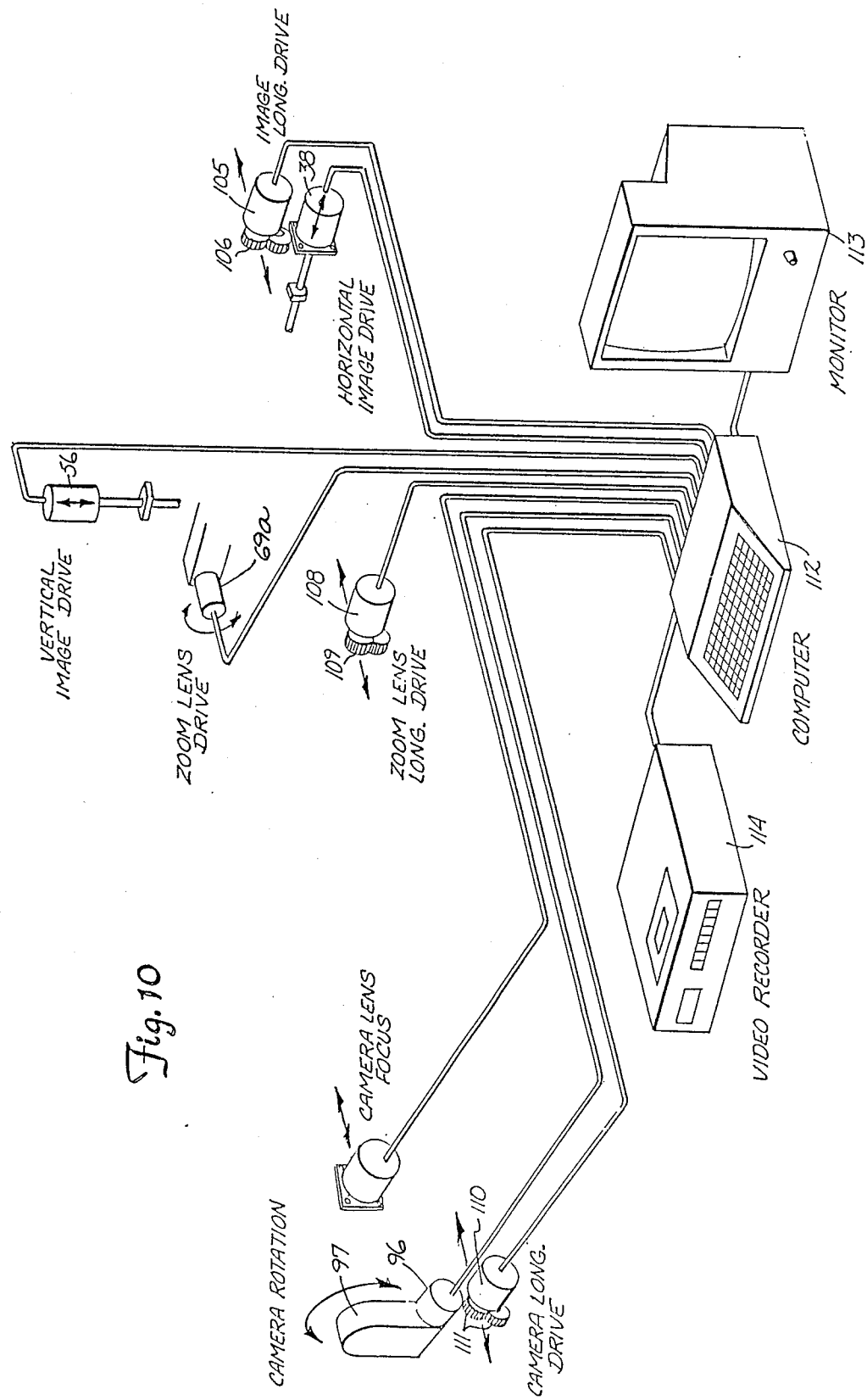
FIG. 10 is a diagrammatic view illustrating the stepper motor drives and the computer control system for controlling and operating the various modules and components.

Again referring to FIG. 10, it will be noted that the control for operating all of the various components of the apparatus comprises a computer 112 which is provided with a suitable display module 113. The computer also is connected in controlling relation with respect to a video recorder 114. In this regard, the computer 112 is connected in controlling relation with respect to the X axis stepper motor 38, the Y axis stepper motor 56, the projection zoom lens stepper motor 69, the stepper motor for the camera zoom optics 101, and the stepper motor 96 for controlling rotation of the image recorder. The computer 112 also controls the axial positioning of the image support module, the projection lens module, and the image recorder module. In this regard, the computer 112 is disposed in controlling relation with respect to stepper motor 105, stepper motor 108, and stepper motor 110.

Figure 11:
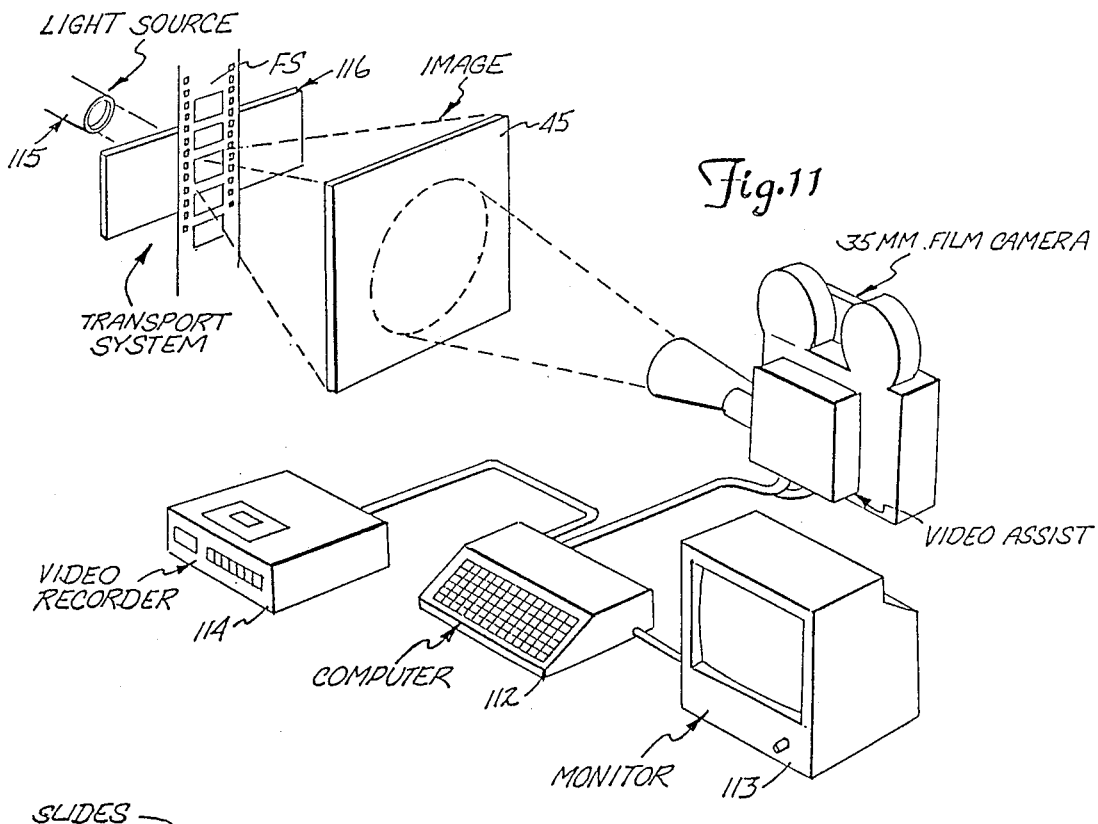
FIG. 11 is a diagrammatic view illustrating the recording of an original film strip.

Referring now to FIG. 11, it will be seen that one mode of use of the modular optical system is diagrammatically illustrated. In FIG. 11, the original to be recorded comprises a film strip FS, which is wound upon a reel (not shown) and is provided with a suitable drive means so that each frame of the film strip is successively moved into position with respect to the optical axis 0. The film strip drive means will be provided for driving the film strip so that the latter is wound upon a takeup reel. A suitable light source 115 is provided, and the light may be diffused through a plate 116 of milkglass or the like. It is pointed out, however, that printed material and other types of images may be front lighted by a front light source, rather than back lighting, if desired. The image will be projected by the projection zoom lens and transmitted through the plano-convex condenser lenses 74, 76 upon a recording surface of the image recorder. In the embodiment shown, a 35 mm camera comprises the image recorder.

Figure 12:
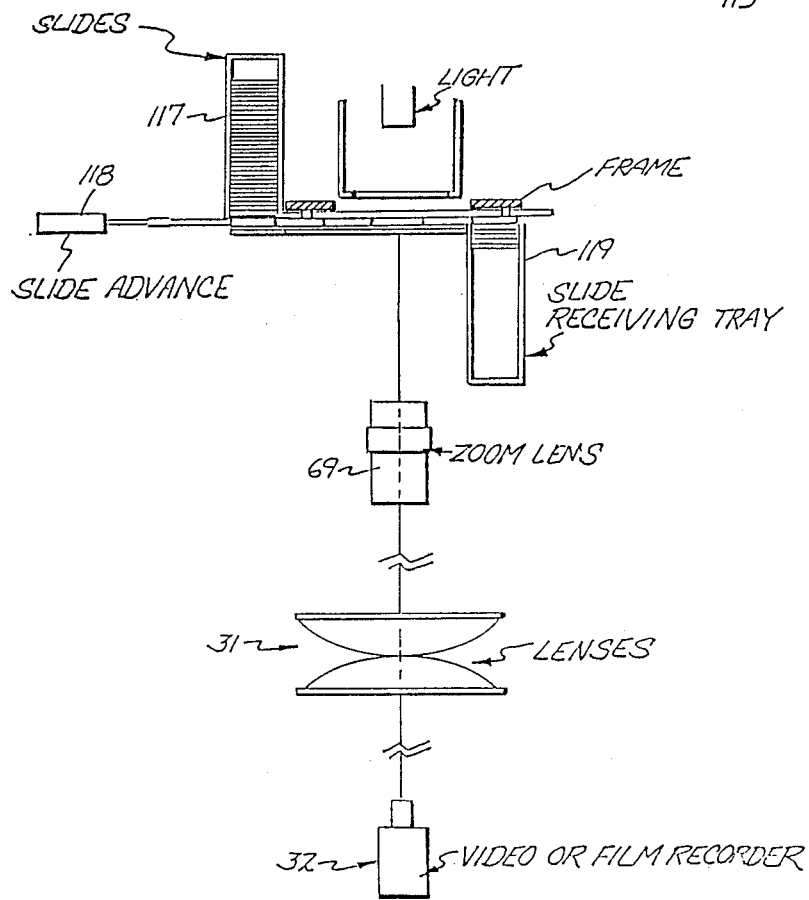
FIG. 12 is a diagrammatic view similar to FIG. 11, but illustrating the recording of the original in the form of slide transparencies.

Referring now to FIG. 12, it will be seen that the original comprises a plurality of slides which are positioned within a slide feed magazine 117. The slides are advanced in a lateral direction by slide advance pneumatic cylinder and piston unit 118. It will be seen that, when the piston rod of the piston and cylinder unit 118 is extended, each slide is successively moved into position so that it is centered on the optical axis 0. It will again be noted that the image will be projected by the zoom projection lens 69 and transmitted through the condenser lenses 74, 76 to create an enlarged aerial image of the portion of the transparency projected by the projection zoom lens. The enlarged aerial image is transferred to the zoom optics of the image recorder which, as shown in FIG. 12, comprises either a video or film recorder. It is pointed out that the film driving mechanism for moving the film strip and the mechanism for supporting and advancing the slide transparencies will be mounted upon the pins 58a on the image support module. This permits the particular mechanism for supporting the originals to be readily mounted or removed from the image support module. Both the drive mechanism for the film strip and the slide advance mechanism will move each frame of the film strip or each slide transparency into centered relation with respect to the optical axis.

Referring now to FIG. 13, it will be seen that the 35 mm projector 120, having a projection zoom lens 121, is mounted upon the pins 58 of the image support module and again will project an image and transmit the image through the condenser lenses, where an enlarged aerial image is created and transmitted to a surface of the image recorder module, which, as shown, may be a video or film recorder.

During operation of the apparatus, various kinds of information is entered through the keyboard of the computer 112. Numerical information as to the location and size of selected images from transparencies or frames of film strips and numerical information as to transition time from one image to the succeeding image may be entered through the keyboard of the computer 112. Computer 112 converts this numerical information into input information for controlling the X-stepper motor 38, the Y-stepper motor 56, the stepper motor 69a, the zoom optics stepper motor 101, and the Z-stepper motor 110. Although not shown in the drawing, a light sensor will be positioned adjacent the light source and produces a signal in response to the light, and this signal is transmitted to the computer. Exposure can then be monitored continuously during operation of the apparatus. A proximity measuring device will be positioned adjacent the slide advance mechanism, and it serves to measure the distance of movement of the slide when the latter is moved into position along the optical axis. In this regard, the proximity measuring device transmits a signal when a slide is shifted to the optical center for image recording. The signal produced by the sensor will indicate whether the slide is a horizontal slide or a vertical slide and automatically adjust the zoom optics of the image recorder module to a predetermined portion. This is controlled by the computer, which is pre-programmed for this adjustment.

Although not shown in the drawing, the computer 112 operates X stepper motor 38 through a driver circuit. Pulse signals are also generated by movement of an encoder (not shown) during movement of the upper support structure 40 in the X direction. These encoder signals will be displayed on the monitor 113. The computer 112 also operates the X axis stepper motor 56 through a driver circuit (not shown). Pulse signals are supplied by an encoder (not shown) in response to movement of the support plate 56 in the Y direction. It is again pointed out that the position of the frame of the film strip or a slide transparency in the Y direction is displayed on the monitor 113, which is controlled by the computer 112.

The image recorder module 32 is movable in a Z direction by the Z stepper motor 110, and impulse signals are supplied to the computer 112 by an encoder in response to movement of the recorder module in the Z direction along the Z axis. Operation of the stepper motor 110 by the computer 112 is through a driver circuit and its position is displayed on the monitor 113. The information for the zoom optics 101 position and setting is entered into the computer and a suitable encoder supplies pulse signals to the computer in response to movement of the zoom optics by the stepper motor 101. Control information relating to the orientation of the image recorder is supplied to the computer 112 so that operation of the stepper motor 96 is controlled by the computer through a driver circuit. Pulse signals are produced in response to movement of the image recorder so that its numerical angular setting will be displayed on the monitor 113.

Control information relating to the zoom projector lens 69 includes a position and setting as entered into the computer 112, and a suitable encoder supplies pulse signals to the computer in response to movement of the zoom projector lens by the stepper motor 69a.

It will be appreciated when all of the information has been supplied to the computer 112, then the control switch for the system will be closed, thereby initiating operation of the optical system. The image to be recorded is positioned along the optical axis 0, and the X stepper motor 38, Y stepper motor 56, Z stepper motor 110, zoom optic stepper motor 101, projection zoom lens stepper motor 69a, and recorder angle stepper motor 96 will be operated until the values corresponding to the preset or initial values are displayed on the monitor 113. In the event that the slides are being recorded on the motion picture film, the operator will then also enter into the computer the various drive speeds for the stepper motors in order to obtain the proper transition from the initial image to the next image to be recorded.

When all of the information has been supplied to the computer 112, the operator will then close a master switch to start operation of the optical system, and this will continue automatically until the final image has been recorded by the image recorder. When this occurs, the various stepper motors will discontinue operation.

In the preferred embodiments of the optical system, approximately 1,000 images may be recorded per hour. This rate of recording is extremely high, when compared to any remotely similar prior art system.

Figure 14:
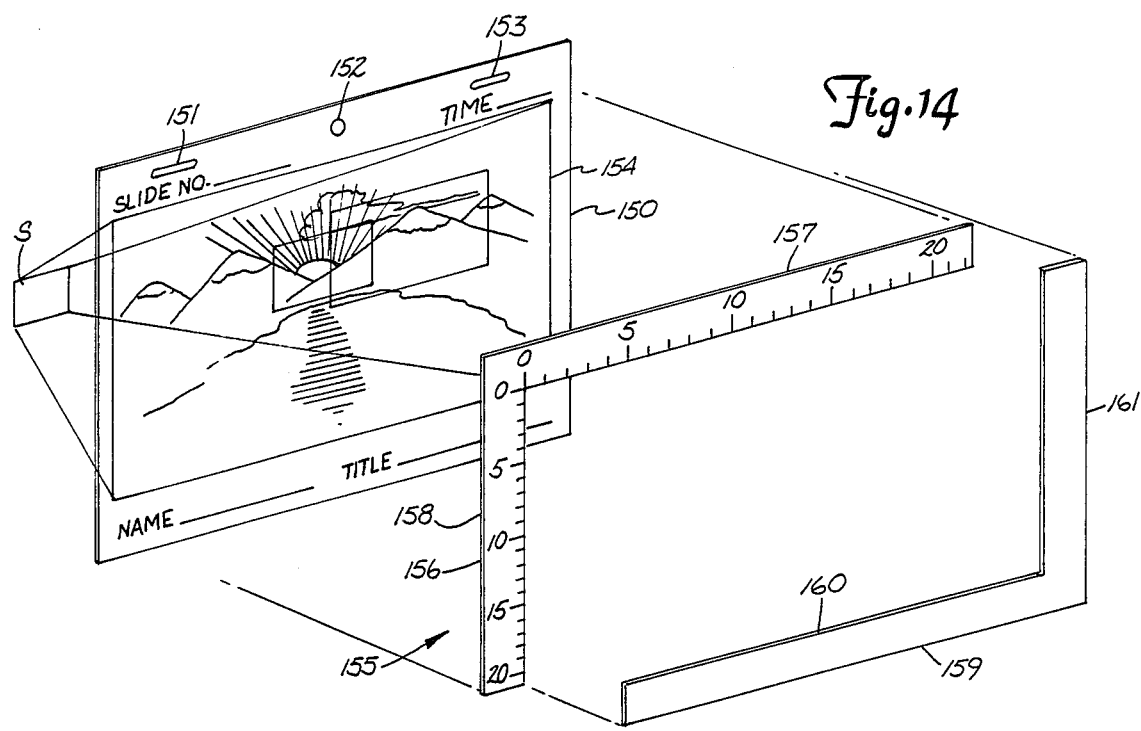
FIG. 14 is a perspective view of the method employed when cropping transparencies.
Figure 15:
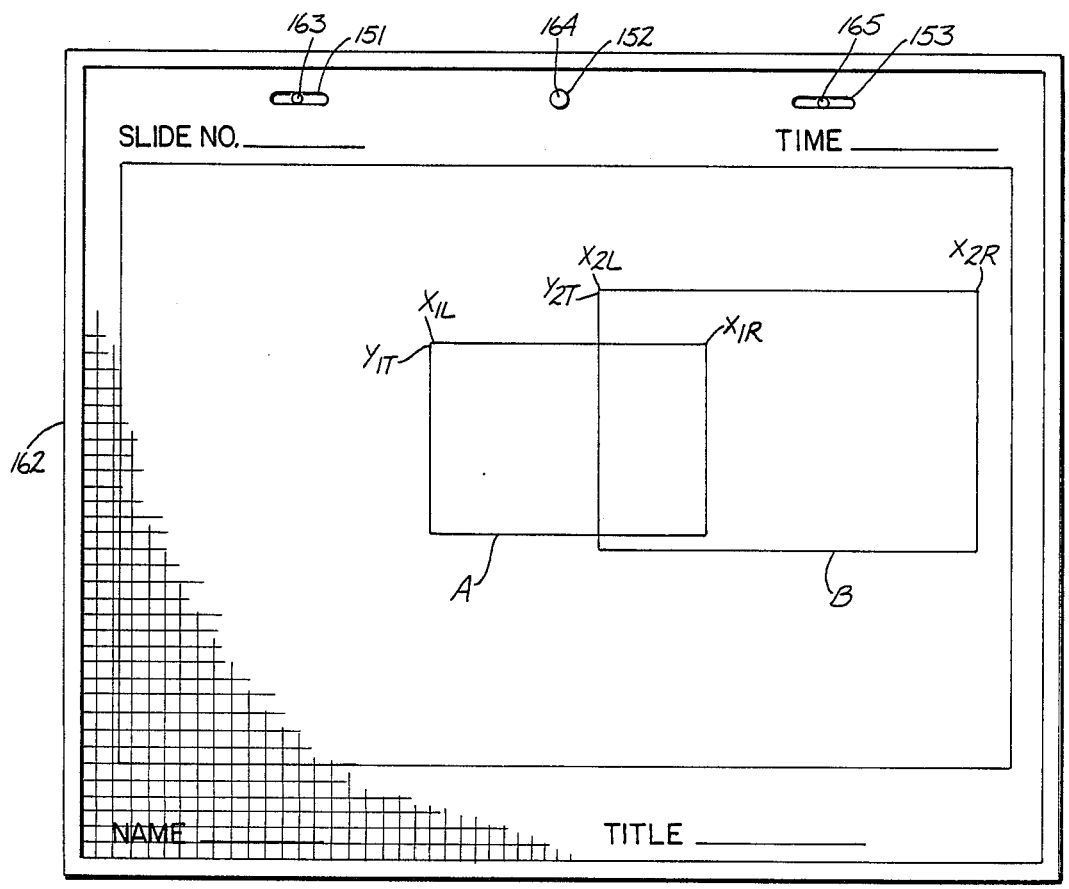
FIG. 15 is an elevational view of a semi-transparent tissue upon which the images are marked and illustrating locations and projections thereof.

Referring now to FIGS. 14 and 15, it will be seen that one method of using the optical system for recording slide transparencies on a film strip or on a video tape is thereshown. In this regard, an operator may obtain precisely the desired images and image transitions, including pans, tilts, zoom ins and zoom outs, while using the present method. In this method, a semi-transparent tissue 150 is used and the tissue is provided with registration holes 151, 152, and 153 along its top edge. The central portion of the tissue 150 has a rectangular outline 154 of predetermined size, and which corresponds to a particular film format of the transparency comprising the original. In the present embodiment, the tissues are available which correspond to 35 mm, 4×5 inch, and other common photographic film formats.

When using the tissue 150, the operator projects an image S (transparency slide or film strip frame) of the original so that the image fills the space defined by the outline 154. Rear screen projection may be used in projecting the image from the original upon the tissue 155, and the image will be visible to the operator when viewing the tissue 150 from the front because the tissue is semi-transparent. It will be appreciated that other types of projectors may be used to project the image from the original upon the tissue.

A proportion finder 155 is used to compose and select the desired position and correct proportion of the initial image from the original. The proportion finder 155 is used by an operator to compose and select the desired position and correct proportion of the initial image from the original. The proportion finder 155 is comprised of an L-shaped member 156 and an L-shaped member 159. It will be seen that L-shaped member 156 has a numerical scale along the horizontal leg 157 thereof and has another scale along the vertical leg 158 thereof. The particular scales which have been selected permit the operator to create the rectangular image corresponding to the proportions of the recording medium. In this regard, the proportion finder 155 may provide the proper proportions for a 16 mm motion picture film. In this proportion finder, the ratio of the horizontal scale to the vertical scale is 4 to 3, which corresponds to the proportions of 16 mm film and a video tape. The proportion finder illustrated in FIG. 14 uses the 4 to 3 proportion. It will be noted that the 0 reference point is located at the corner common to both scales.

The operator will apply the proportion finder 155 to the surface of the tissue 150 and will use the proportion finder to outline the initial image. In doing this, the operator positions the horizontal leg 160 of the L-shaped member 159 so that its inner edge is aligned with a number on the vertical scale of the leg 158 for the L-shaped member 156. The operator aligns the inner edge of the vertical leg 161 of the L-shaped member 159 with the corresponding number on the scale of leg 157. The operator then draws a rectangular outline on the surface of the tissue 150 by tracing the inner edges of the legs 157, 158, 160, and 161. This same procedure will be followed if the operator desires to compose and proportion additional images. In FIGS. 14 and 15, two images A and B have been composed and proportioned from a single original.

The operator will then label the outlines of the images on the tissue in sequence, and will indicate the slide number (or frame) which identifies the original. The operator will also enter the transition time from one image A to a second image B on the tissue 150. It will be noted that the transition from image A to image B will involve a pan to the right with a slight tilt upwardly. The transition also involves a zoom out from image A to image B. The process is repeated by the operator for each transparency or frame from which a motion picture sequence or video tape is to be derived. Each transparency original which is recorded is given a number and the corresponding tissue 150 is identified by that number.

The operator will then collect the transparencies or slides corresponding to tissues 150. A digitizing method is used to derive the numerical coordinates and to enter the value of the coordinates into the computer. In this regard, a computer tablet 162 will be used, which has a suitable grid surface thereon and which is provided with a suitable stylet or pen. When the stylet or pen is touched to the computer tablet, an input signal is entered into the computer 112. The operator is, therefore, able to readily derive and input the numerical coordinates from the various images. Although graphics pads are highly effective in deriving and entering the coordinates of the images into the computer, it is pointed out that other types of devices for deriving and entering numerical coordinates for images may also be used.

The operator is able to derive numerical coordinates $X_1L$, $X_1R$, and $Y_1T$ from image A. In the embodiment shown, $X_1L$ represents the X coordinate of the left side of the image A and $X_1R$ corresponds to the X coordinate of the right hand edge of the image outline A. Coordinate $Y_1T$ corresponds to the Y coordinate of the top edge of image A. The operator is also able to derive the numerical coordinates $X_2L$, $X_2R$, and $Y_2T$ from the grid device 162. These coordinates define the location and desired proportion of image B.

The time duration is also entered through the keyboard into the computer 112. Based upon these input coordinates for images A and B and the time duration for transition between the images A and B, the computer 112 determines the proper control information for controlling the operation of the various stepper motors. The numerical values for the coordinates $X_1L$ and $Y_1T$ identify the upper left hand corner of image A, and the numerical values for the coordinates $X_1L$ and $X_1R$ indicate the desired proportion, since the Y proportion has a predetermined ratio to the X proportion. The coordinate values for $X_1L$, $X_1R$, and $Y_1T$ provides the original setting for the X axis motor 38, the Y axis stepper motor 56, the Z axis stepper motor 110, and the zoom optics stepper motor 101. The final desired settings are provided from the numerical values of $X_2L$, $X_2R$, and $Y_2T$. It will be appreciated that the coordinate values $X_2L$ and $Y_2T$ define the location of image B, and the coordinates $X_2L$ and $X_2R$ define the desired proportion.

It will be appreciated that image A will be required to be magnified substantially in order to fill the entire field of the frame for video tape. On the other hand, less magnification will be required for image B. The information for controlling the proper magnification, proportion, and location will be provided by the computer 112.

It will also be appreciated that the image support module 29 is constructed to support and accommodate a 35 mm film drive, a 4×5 slide transparency advance mechanism, and microfiche or microfilm which may be recorded for motion pictures. The modular construction permits the entire base cabinet unit 12 to be removed, along with the entire image support module, so that other image support systems can be employed. Similarly, the image support module 29 may be removed and various image support mechanisms may be mounted on the image support module. This wide range of versatility allows recording of various kinds of originals.

Referring now to FIGS. 16–20, it will be seen that we have also provided suitable adaptors for the image support module 29. The adaptors serve to hold various types of images, such as 4 inch by 5 inch slides, $2\frac{1}{4}$ inch by $2\frac{3}{4}$ inch slides, $2\frac{1}{4}$ inch square slides, and 35 mm slides.

Referring now to FIGS. 16 and 17, it will be seen that a relatively large adaptor plate 200 is mounted on the pins 58a of the image support module 29. The adaptor plate 200 has a large opening 201 therein of rectangular configuration to define horizontal frame elements 202 and vertical frame elements 203. These frame elements have suitable openings 204 therein through which the pins 58a project.

The lower horizontal frame elements 202 of the adaptor plate 200 have a pair of pins 206 positioned adjacent one end portion thereof, and one of the vertical frame elements 203 has a pin 207 affixed thereto and projecting outwardly therefrom. The pins 206 and 207 are positioning and locating pins for positioning the image holder plate 208. The image holder plate 208 is of generally rectangular configuration and has a rectangular opening 209 therein. Means are provided for securing the image holder plate 208 against the adaptor plate 200, and this means includes a magnetic strip 210 formed of plastic and magnetic material. The strip is positioned against the rear surface of the image holder plate 208 and against the front surface of the adaptor plate, as best seen in FIG. 17, to securely but releasably hold the image holder plate against the adaptor plate.

Figure 20:
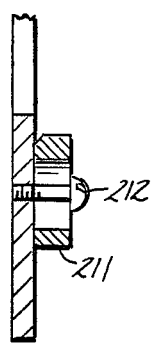
FIG. 20 is a cross-sectional view illustrating the manner in which the bar support is secured to the adaptor.

The image holder plate 208 also has a support bar 211 secured thereto by suitable bolts 212, as best seen in FIGS. 17 and 20. The support bar 211 is positioned below the opening 209 and in spaced parallel relation with the lower edge defining the opening. The slide 214 is positioned over the opening 209 and engages the support bar 211, as best seen in FIG. 17. A magnetic strip 213 is positioned over the upper edge surface of the slide 214 to hold the slide against the image holder plate 208. The image holder plate is also provided with an upper flange 215 which serves as a finger grip for ease in handling the image holder plate.

It is also pointed out that, when the image holder plate is secured to the adaptor plate 200, the X axis and Y axis stepper motors will be actuated to position the image on the image holder plate along the optical axis. Once this is done, the image holder plates, when changed, will always be positioned along the optical axis.

Figure 18:
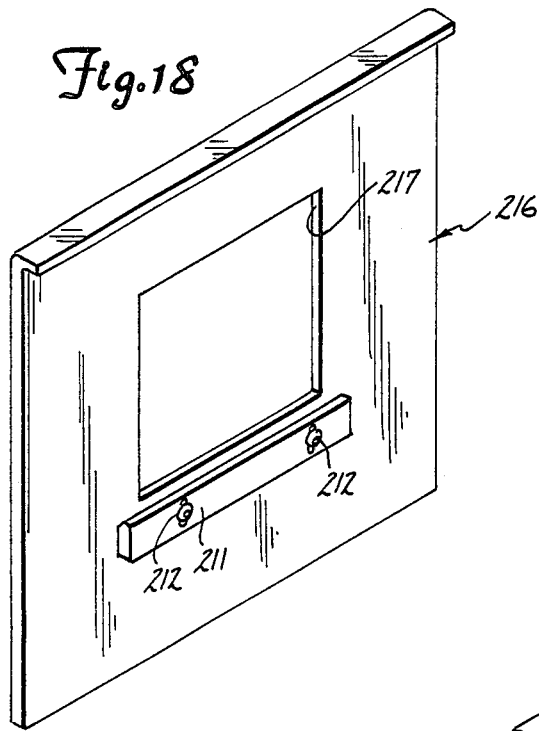
FIG. 18 is a perspective view of another adaptor similar to the adaptor of FIG. 16.
Figure 19:
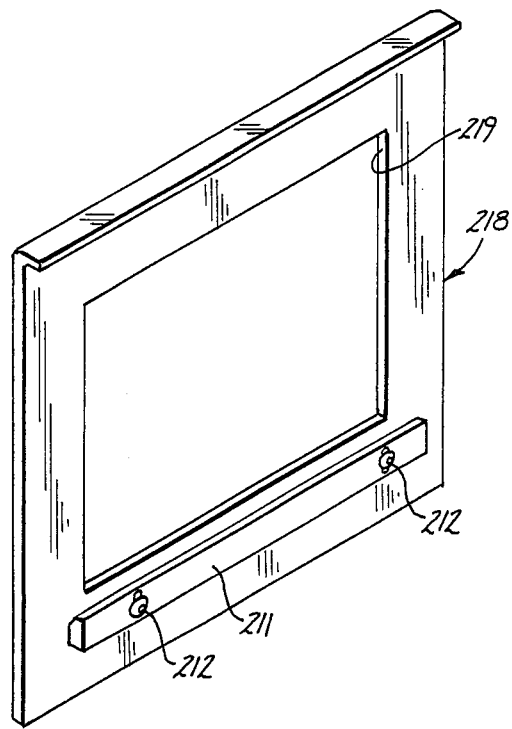
FIG. 19 is a perspective view of still another adaptor.

Referring now to FIG. 18, it will be seen that a different image holder plate 216 is thereshown and is provided with an opening 217 therein. FIG. 19 of the drawing illustrates an image holder plate 218 having an opening 219 therein. The size of the central openings in the image holder plates corresponds to the particular size of the image to be recorded. Thus, in the example shown, image holder plate 208 is for use with a $2\frac{1}{4}$ inch by $2\frac{3}{4}$ inch slide, while image holder plate 216 is for use with a $2\frac{1}{4}$ inch square slide. The image holder plate depicted in FIG. 19 is for a 4 inch by 5 inch slide. As pointed out above, image holder plates are also provided for other size slides, including a 35 mm slide. As used herein, the image support plate is intended to support various types of images, such as transparencies, slides, microfiche, film strips, and the like.

It is pointed out that the image holder plates are adapted for use with both the horizontal and vertical format. The image holder plates have been illustrated in FIGS. 16–19 for use in a horizontal mode format. It will also be appreciated that, by turning each of the image holder plates through an arc of 90 degrees, each image plate will then be adapted for use in a vertical format. It is further pointed out that the image holder plates and adaptor permit rapid recording of images. In a typical operation, several image holder plates may be provided and will be pre-loaded, allowing the image plates and images to be changed rapidly. It is also pointed out that the use of magnetic strips provides an effective holding means which operates not only on the adaptor plate, but also on the associated image holder plate.

Although not shown in the drawing, a light sensor may be provided so that the computer can sense light intensity and possibly color.

It will also be appreciated that, when 4×5 microfiche originals are recorded on a motion picture film or a video tape, the computer will control operation of the zoom optics so that only one microfiche image will be produced or recorded on the recording surface. Control of the zoom optics will be through information provided the computer 112 so that all 50 different images may be recorded by proper programming of the computer. This is also true of the recording of portions of a conventional 9×9 aerial photograph. The X and Y stepper motor and the zoom optics may be programmed to permit recording of each selected portion of the aerial photograph within certain size constraints.

It will also be appreciated that the image recorder may be readily changed as desired to permit interchanging of video cameras for motion picture cameras, for example.

The present apparatus system is also especially effective in recording images of old film, such as Thomas Edison film. By proper programming, the older film, which is erratic because of the materials used and the filming techniques, can be corrected and stabilized. In this older film, the images may be tilted and present a non-horizontal frame, but the present optical system permits tilted or uneven frames to be corrected. In making such corrections, there are usually one or more frames in a strip which are perfectly even with respect to the horizon. The X, Y, and Z information is programmed with respect to the selected frame, and all of the other frames are re-recorded based on the reference print frame with respect to positioning.

Another advantage of the present apparatus and system is the ability of the system to provide inventory information relating to the originals being reproduced. For example, each slide transparency to be reproduced on a different medium usually has certain information contained on the slide relating to its identity, such as slide number or the like. The present system permits this information to be inventoried during the reproduction process. This inventory information may be printed out on hard copy, or it may be electronically stored on a floppy disc or the like. The control computer also records which frame number the particular slide image has been recorded on. Thus, the inventory information permits correlation of the slide number with a video disc frame number or film frame number.

In this regard, the apparatus system will be provided with a conventional commercial optical scanner, which may be mounted in a convenient place to select information from each slide as it is being advanced. The automatic optical scanner may read a bar code or may read an alpha-numerical code, as desired. This optical scanner (not shown) constantly inputs this information into a computer with respect to the information appearing on the slide. The computer can inventory, record, and retrieve this information.

The inventory information is not only stored, but this information is also matched to the frame number, text, or sequence number of the image (slide, microfiche, or the like) on a video disc or the like. For example, this inventory information may be used in conjunction with archival storage, such as a video disc. Retrieval of selected subject matter, such as a slide or frame identified by the computer memory, from, for example, a 20,000 frame computer disc, may be readily and rapidly done.

With the present system, still images may be recorded at an extremely high rate of speed, which is not present in prior art systems. When an automatic feed is employed, approximately 1,000 images per hour may be recorded, while monitoring the horizontal and vertical orientation of the slides and simultaneously recording the inventory information. It is also pointed out that the present system permits masking of images and also permits overlay factors to be accomplished. In this regard, overlay text and graphics may be performed with respect to selected images. All of the aforementioned functions may be accomplished while precisely and rapidly recording the images on a different medium.

From the foregoing, it will be seen that we have provided a novel optical system and method of reproducing images from an original upon a different medium in a manner which is more efficient than any heretofore comparable system.

What is claimed is:

1. A modular optical system for reproducing and recording an image original from one medium, upon a receiving surface of the same kind of medium or a different medium, comprising:
   a modular support means,
   an image support module for supporting the original to be recorded, and means adjustably and detachably mounting said image support module on said support means,
   an image recorder module spaced from said image support module and being positioned on an optical axis, means adjustably and detachably mounting said image recorder module on said support means, said image recorder module having a recording surface, such as a film strip, slide transparency, microfiche, video tape, or the like, upon which the original is to be recorded,
   a condensing lens module positioned on said optical axis between said image support module and said image recorder module and defining a nodal point on the optical axis between the condensing lens module and the recording surface of said image recorder module,
   a projection lens module including a projection objective lens positioned on the optical axis between the image support module and the condensing lens module,
   variable focus lens means positioned on the optical axis between the condensing lens module and the receiving surface of said image recorder module and having a center of optics positioned on the optical axis, said variable focus lens means providing a variable magnification of the image from the original in response to a first control signal,
   power means for shifting the variable focus means and the recording surface of said image recorder module coaxially of the optical axis in response to a second control signal, and
   computer control means for producing the first and second control signals to provide a desired magnification of the image from the original, while maintaining the center of optics of the variable focus lens means at the nodal point.

2. The modular optical system as defined in claim 1 wherein said image support module includes a pair of carriages, one of which supports the original image to be recorded, means connecting said one carriage with the other carriage, means for moving said one carriage along a Y axis in a plane perpendicular to said optical axis in response to a third control signal from the computer control means, and means for moving said other carriage along an X axis in a plane perpendicular to said optical axis in response to a fourth control signal from said computer control means.

3. The optical system as defined in claim 2 and image advance means detachably mounted on said one carriage to permit ready removal thereof, said image advance means supporting the originals to be recorded and being operable to successively advance each original into position for recording along the optical axis.

4. The optical system as defined in claim 3 wherein the original to be recorded comprises a slide transparency, said image advance means containing a plurality of slide transparencies, and means for shifting said slides in a lateral direction in a plane perpendicular to the optical axis to successively advance each slide into position along the optical axis for recording.

5. The modular optical system as defined in claim 2 wherein said means for moving said one carriage along the Y axis comprises a Y stepper motor and said means for moving said other carriage along an X axis comprises an X stepper motor.

6. The modular optical system as defined in claim 1 wherein said image recorder module comprises a frame shiftably mounted on said support means, an image recorder having a recording surface and being shiftably mounted on said support frame, and means connected with said image recorder for rotating the latter and the recording surface about an axis coextensive with the optical axis in response to a fifth control signal, said computer control means producing the fifth control signal to provide correct orientation of the image on the recording surface.

7. The modular optical system as defined in claim 6 wherein said means for swinging said image recorder and said recorder surface comprises a stepper motor.

8. The modular optical system as defined in claim 1 wherein said variable focus lens means and said projection objective lens both comprises zoom optics, and means operatively connected with said projection lens zoom optics for rotating the same and providing a variable magnification of the image from the original in response to a sixth control signal, said computer control means producing the sixth control signal to provide the desired magnification of the image from the original.

9. The modular optical system as defined in claim 8 wherein said projection lens zoom optics is supported on a carriage shiftably mounted on rod means for adjustable movement in a direction parallel to said optical axis, and power means for shifting said projection lens zoom optics carriage in said direction towards and away from said image support module in response to a seventh control signal provided by said computer control means.

10. The modular optical system as defined in claim 9 wherein said image support module is adjustably supported on rod means for movement in a direction parallel to said optical axis, and power means for shifting said image support module in said direction towards and away from said projection zoom lens optics in response to an eighth control signal provided by said computer control means.

11. The modular optical system as defined in claim 1 wherein said image support module includes a plurality of generally horizontally extending pins on which different types of image media may be selectively and removably mounted.

12. The optical system as defined in claim 1 wherein said modular support means comprises a pair of separable base support units, each base support unit having a pair of elongate spaced apart substantially parallel rods thereon, said image support module being shiftably mounted on the rods of one of said base units for movement in a direction parallel to said optical axis and said projection lens module, and said image recorder module being shiftably mounted on the rods of the other base support unit, means releasably coupling each rod on one base support unit in aligned, secure relation with a rod on the other base support unit, said coupling means being readily detachable from said rods to permit said base support units to be separated from each other.

13. The modular optical system as defined in claim 1 and a slide holder device releasably mounted on said image support module to position the slide image along the optical axis, said slide holder device being readily detachable from and reattachable to the image support module to permit slides to rapidly be changed and recorded.

14. A process of reproducing images from a photographic original upon a receiving surface, comprising:

projecting an image from an original upon a work medium having a field of predetermined magnitude, marking on the work medium a desired location and desired proportion of an image to be reproduced from the original, assigning numerical values to the selected markings on the medium in accordance with a predetermined ratio, projecting an image of the original on an optical axis upon a receiving recording surface, selectively positioning the original along a plane perpendicular to the optical axis as a function of the numerical values relating to the location marked on the work medium, and magnifying the image from the original as a function of the numerical values of the selected marked proportion on the work medium to permit recording of the selected marked image on the receiving surface.

* * * * *